United States Patent
Wilms et al.

(10) Patent No.: US 10,075,763 B2
(45) Date of Patent: Sep. 11, 2018

(54) VIDEO CHANNEL CATEGORIZATION SCHEMA

(71) Applicant: Google Inc., Mountain View, CA (US)

(72) Inventors: Kurt Wilms, San Francisco, CA (US); Clement Courbet, Paris (FR); Vincent Simonet, Paris (FR)

(73) Assignee: Google LLC, Mountain View, CA (US)

( * ) Notice: Subject to any disclaimer, the term of this patent is extended or adjusted under 35 U.S.C. 154(b) by 7 days.

(21) Appl. No.: 14/732,197

(22) Filed: Jun. 5, 2015

(65) Prior Publication Data

US 2016/0360266 A1    Dec. 8, 2016

(51) Int. Cl.
*H04N 21/442* (2011.01)
*H04N 21/25* (2011.01)
*H04N 21/475* (2011.01)

(52) U.S. Cl.
CPC ..... *H04N 21/44204* (2013.01); *H04N 21/251* (2013.01); *H04N 21/44222* (2013.01); *H04N 21/4756* (2013.01)

(58) Field of Classification Search
CPC ....... H04N 21/44204; H04N 21/44222; H04N 21/4532; H04N 5/44543; H04N 21/4826; H04N 21/4756; G06F 17/3053; G06F 17/30699
See application file for complete search history.

(56) References Cited

U.S. PATENT DOCUMENTS

| | | | | |
|---|---|---|---|---|
| 8,706,655 B1 * | 4/2014 | Rangarajan | ........ | H04N 21/4756 706/12 |
| 8,996,629 B1 * | 3/2015 | Datar | ................ | G06F 17/30041 709/206 |
| 2008/0104058 A1 * | 5/2008 | Billmaier | ......... | H04N 21/44222 725/14 |
| 2009/0144272 A1 * | 6/2009 | Adarsh | ............ | H04N 21/44222 725/14 |
| 2010/0017814 A1 * | 1/2010 | Archer | ............. | H04N 21/44222 725/14 |
| 2010/0082650 A1 | 4/2010 | Wong | | |
| 2011/0321072 A1 * | 12/2011 | Patterson | ......... | H04N 21/44222 725/5 |
| 2013/0204825 A1 * | 8/2013 | Su | ............................ | G06N 5/04 706/46 |
| 2014/0331242 A1 * | 11/2014 | De La Garza | ... | H04N 21/44218 725/12 |
| 2016/0150259 A1 * | 5/2016 | Sokolov | ......... | H04N 21/234309 725/1 |

FOREIGN PATENT DOCUMENTS

WO    2014186763    11/2014

* cited by examiner

*Primary Examiner* — Hai V Tran
(74) *Attorney, Agent, or Firm* — Lowenstein Sandler LLP

(57) ABSTRACT

Implementations are disclosed for scoring and categorizing a video channel. A method includes receiving category identifiers associated with a plurality of videos in a video channel. The plurality of videos is associated with a plurality of categories specified by the category identifiers. The method further includes receiving ratings of each of the plurality of videos in the video channel. The ratings are based on video use within the video channel. The method further includes generating one or more scores of the video channel in view of the category identifiers and the ratings. Each of the one or more scores is indicative of relevance of the video channel to a respective category specified by the category identifiers.

20 Claims, 9 Drawing Sheets

VIDEO CHANNEL CATEGORIZATION SCHEMA

TECHNICAL FIELD

This disclosure relates to the field of video channel categorization, in particular, to video channel categorization in view of relevancy of the video channel to various categories.

BACKGROUND

Consumers can browse and search the Internet for videos that is of interest to them. For example, consumers can use a search engine to find a popular music video. When a search is performed for a particular popular music video, other videos may appear in the search results that are not related to and are not particular relevant to the particular music video that the user is searching for.

Consumers can also access channels in order to view, download, and/or otherwise access videos. Other types of multimedia content, besides videos, may be accessed including audio clips, movie clips, TV clips, and music videos, as well as amateur content such as video blogging, short original videos, pictures, photos, other multimedia content, etc.

SUMMARY

The following presents a simplified summary of various aspects of this disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the present disclosure, a method includes receiving category identifiers associated with a plurality of videos in a video channel. The plurality of videos is associated with a plurality of categories specified by the category identifiers. The method further includes receiving ratings of each of the plurality of videos in the video channel. The ratings are based on video use within the video channel. The method further includes generating one or more scores of the video channel in view of the category identifiers and the ratings. Each of the one or more scores is indicative of relevance of the video channel to a respective category specified by the category identifiers.

In some implementations, the method further includes outputting one or more of the plurality of categories specified by the category identifiers having a score exceeding a threshold score.

In some implementations, categories specified by the category identifiers comprise one or more of broad categories and narrow categories.

In some implementations, the ratings are further based on one or more of a number of subscribers to each of the plurality of videos, a number of users uploading each of the plurality of videos, and a number of users selecting to like each of the plurality of videos.

In some implementations, a video of the plurality of videos is discarded based on a low rating of the video prior to the generating of the one or more scores.

In some implementations, the one or more scores of the video channel are further generated based on user consumption of the channel. The user consumption of the channel includes one or more of a number of channel views, channel-driven watch time, channels subscribers, channel use, and channel curation events.

In some implementations, one of the ratings is assigned based on analyzation of text associated with a respective video of the plurality of videos.

In some implementations, the generating of the one or more scores is based on a function of a trained fuser model that is generated to predict the one or more scores.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
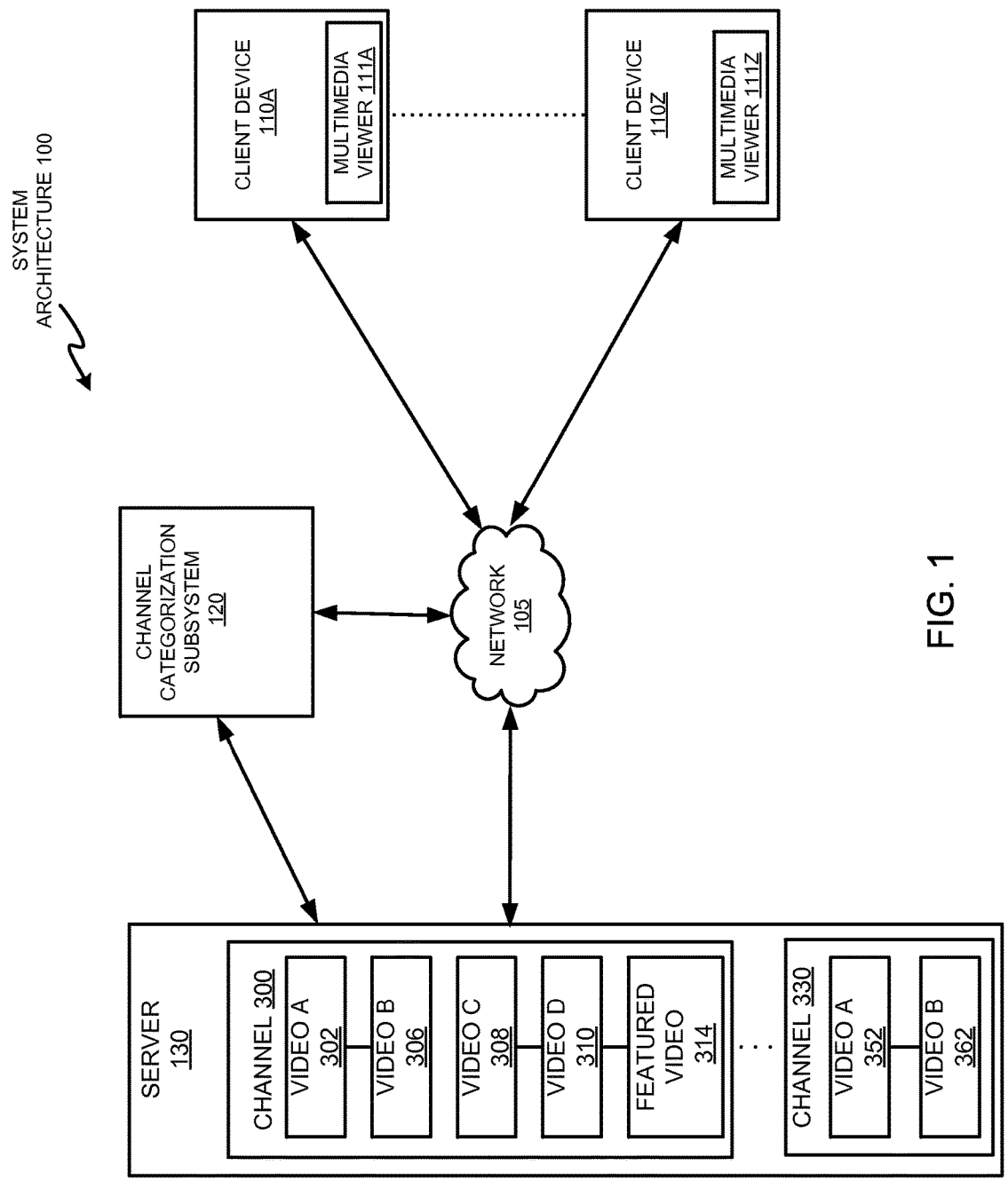
FIG. 1 illustrates an exemplary system architecture in accordance with an implementation of the disclosure.

Aspects and implementations of the present disclosure are directed to a video channel categorization scheme for scoring and categorizing video channels that provide multimedia content. Implementations are described for multimedia content such as audio clips, movie clips, TV clips, and music videos, as well as amateur content such as video blogging, short original videos, pictures, photos, other multimedia content, etc. included a video channel. The video channel is assigned a score for a particular category and all of the categories and respective scores are output for the video channel. Each video channel is assigned a score based on the video channel as a whole and based on ratings of the multimedia content included in the channel. The score of the channel for a category can be compared to other scores of other channels also associated with the category to establish a hierarchy of the channels for the particular category.

The score assigned to the channel can be based on several factors including metadata associated with the multimedia content provided by the channel and how users consume the multimedia content. Factors indicative of how users consume the multimedia content may include channel-driven watch time, subscriptions, curation events, etc. Channel-driven watch time is the amount of time a user spends on the channel from the time the user access the channels until the user exits the channel. Subscriptions are determined by the amount of users subscribed to a channel. The subscribed users may receive updates or other information periodically from the channel. Curation events may include "subscribing", "liking", "following", "friending", and so on. These factors may be calculated and/or saved in the form of cumulative numbers or averages.

Existing multimedia content providers allow users to search for individual multimedia content by using, for example, a keyword search or by selection of a multimedia content included within category. Suppose that a user wishes to find videos related to baseball. The user may type the keyword baseball into a search field or, alternatively, the user may select a category entitled baseball to view videos related to baseball. However, the individual multimedia content search cannot be extended to groups of multimedia content. That is, users cannot search for groups of videos in a channel or a playlist that is related to baseball.

Implementations of the disclosure address the above deficiencies by scoring and categorizing groups of videos as a whole that are included in a common channel or playlist. By categorizing the channel or playlist, the channel or playlist can be searched based on a category. When a user performs a search for channels or playlists, the user is provided with results of the appropriate channels or playlists based on categorical scores assigned to the channels or playlists. The scores provide a hierarchy of the channels or playlists based on the search criteria associated with a category so that higher scored search results are provided first before lower scored search results.

Accordingly, described herein in various implementations are technologies that score and categorize groups of videos included in a channel or playlist. By scoring and categorizing the channels or playlists, users can browse and search for the groups of videos in a channel or playlist.

In one implementation, a machine-learned model is built (i.e., trained) and utilized to identify the scores and categories of channels.

Multimedia content may be consumed via the Internet and/or via a mobile device application. For brevity and simplicity, an online video (also hereinafter referred to as a video) is used as an example of a multimedia content throughout this document. However, the teaching of the present disclosure is applied to multimedia content generally and can be applied to various types of multimedia content, including for example, video, audio, text, images, etc. As used herein, multimedia content can include an electronic file that can be executed or loaded using software, firmware or hardware configured to present the digital media item to a category.

FIG. 1 illustrates an exemplary system architecture 100, in accordance with an implementation of the disclosure. System architecture 100 includes client devices 110A-110Z, a network 105, a channel categorization subsystem 120, and a server 130. Each of the various devices of system architecture 100 may be connected to one another via network 105. In one implementation, channel categorization subsystem 120 may communicate directly with server 130 or via network 105. In an implementation, channel categorization subsystem 120 is external to server 130. In another implementation, channel categorization subsystem 120 may be a part of server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In an embodiment, server 130 may be a video sharing platform that provides access to videos, etc. The video sharing platform provides sharing of videos on the video sharing platform.

In one implementation, client devices 110A-110Z may include one or more computing devices such as personal computers (PCs), laptops, mobile phones, smart phones, tablet computers, netbook computers etc. Client devices 110A-110Z may also be referred to as "user devices." An individual user may be associated with (e.g., own and/or use) one or more client devices (e.g., one or more of client devices 110A-110Z). Client devices 110A-110Z may each be owned and utilized by different users at different geographical locations. Each client device includes a respective media viewer 111A-111Z. In one implementation, media viewers 111A-111Z may be applications that allow users to view images, videos, web pages, documents, etc. For example, media viewers 111A-111Z may be web browsers that can access, retrieve, present, and/or navigate the videos (e.g., web pages such as Hyper Text Markup Language (HTML) pages, digital media items, etc.) provided by a web server. Media viewers 111A-111Z may render, display, and/or present the videos (e.g., a web page, a media viewer) to a user. Media viewers 111A-111Z may also display an embedded media player (e.g., a Flash® player or an HTML5 player) that is embedded in a web page (e.g., a web page that may provide access to videos). In another example, media viewers 111A-111Z may be standalone applications that allow users to view digital videos, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. According to aspects of the present disclosure, media viewers 111A-111Z may be applications that allow users to view and search for channels or playlists that contain multiple videos.

In one implementation, server 130 and channel categorization subsystem 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, hardware components, or combinations thereof that may be suitable for implementing the various features described herein. In some implementations, server 130 can enable media collaboration services such as audio and/or video conferences (e.g., among users of client devices 110A-110Z) using, for example, streaming video or voice over IP (VoIP) technologies and may be used for personal, entertainment, business, educational or academically-oriented interactions. Server 130 may be dedicated to providing video services and/or video hosting services.

In one implementation, server 130 hosts multiple channels and videos associated with each of the multiple channels. Server 130 hosts channel 300-channel 330. Channel 300 includes video A 302, video B 306, video C 308, video D 310, and featured video 314. Channel 330 includes video A 352 and video B 362. Other channels and videos than depicted may be hosted by server 130.

Users employing client devices 110A-110Z can view channel 300, channel 330, and/or any of the videos associated with each channel. The multimedia viewers 111A-111Z can display (e.g., using a graphical user interface) a channel and/or videos hosted by server 130.

A channel may include videos available from a common source or videos having a common topic, theme, or substance. The videos can be chosen by a user, made available by a user, uploaded by a user, chosen by a video provider, chosen by a broadcaster, etc. A channel can be associated with an owner, who is a user(s) that can perform actions on the channel and upload or associated videos (that are to be provided within) the channel. The owner can provide a brief description and/or keywords (e.g., metadata) associated with the channel. Different activities can be associated with the channel based on the owner's actions, such as the owner making video available on the channel, the owner selecting (e.g., liking) videos associated with another channel, the owner commenting on videos associated with another channel, etc. Users, other than the owner of the channel, can subscribe to one or more channels in which they are interested. The concept of "subscribing" is also called a curation event and may also be referred to as "liking", "following", "friending", and so on.

In an another implementation (not depicted), the channels may be hosted by a separate server and accessible by server 130.

Channel categorization subsystem 120 scores and categorizes the channels hosted by server 130. Channel categorization subsystem 120 analyzes a number of factors in order to score and categorize the channels. Details regarding channel categorization subsystem 120 are described herein below with respect to FIG. 2.

Although server 130 is depicted as hosting channels 300 and 330, server 130 may also store playlists created by users, third parties or automatically. A playlist may include a list of videos that can be played (e.g., streamed) in a sequential or shuffled order on the video sharing platform.

Although implementations of the disclosure are discussed in terms of video sharing platforms that provide sharing of videos on the video sharing platform, implementations may also be generally applied to any type of network (i.e., a social network) providing connections between users. Implementations of the disclosure are not limited to video sharing platforms that provide access to channels and/or channel subscriptions to users.

In situations in which the systems discussed here collect personal information about users, or may make use of personal information, the users may be provided with an opportunity to control whether the video sharing platform (i.e., server 130) and/or channel categorization subsystem 120 collects user information (e.g., information about a user's social network, social actions or activities, profession, a user's preferences, or a user's current location), or to control whether and/or how to receive video from the video server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the video sharing platform.

Figure 2:
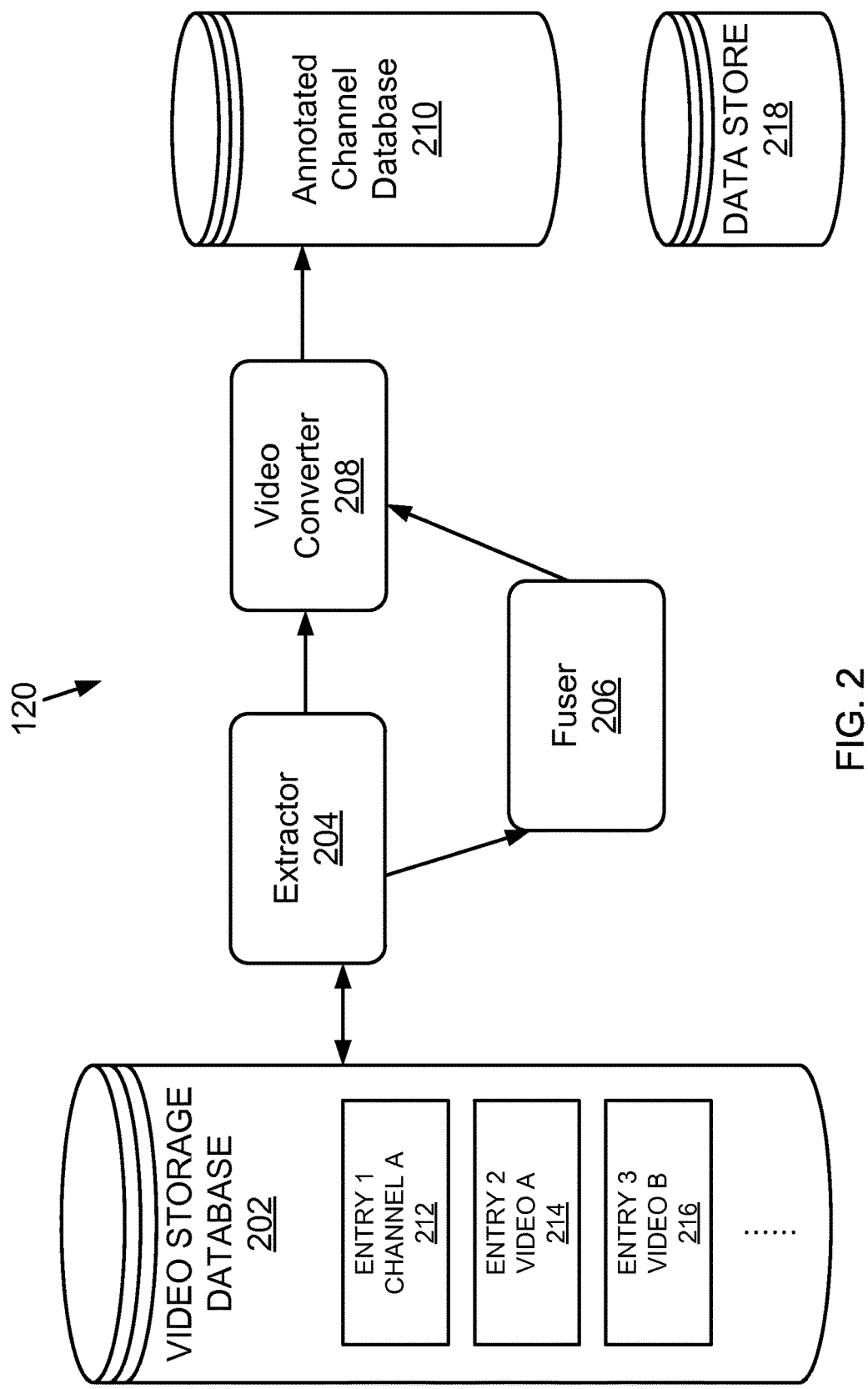
FIG. 2 is a block diagram illustrating functional components of a channel categorization subsystem in accordance with an implementation of the disclosure.

FIG. 2 is a block diagram illustrating functional components of a channel categorization subsystem 120 in accordance with an implementation of the disclosure. Channel categorization subsystem 120 includes several components (e.g., modules, sub-modules, applications, etc.) that can be executed by one or more processors of channel categorization subsystem 120. These components may include, for example, a video storage database 202, an extractor 204, a fuser 206, a video converter 208, and an annotated channel database 210. More or less components can be included in channel categorization subsystem 120 to provide functionality described herein.

Channel categorization subsystem 120 may include a data store 218 such as a memory (e.g., random access memory), a cache, a drive (e.g., a hard drive), a flash drive, a database system, or another type of component or device capable of storing data. Data store 218 may also include multiple storage components (e.g., multiple drives or multiple databases) that may also span multiple computing devices (e.g., multiple server computers). In some implementations, data store 218 may be cloud-based. One or more of the devices of system architecture 100 may utilize data store 218 to store public and private data, and data store 218 may be configured to provide secure storage for private data.

In the depicted embodiment of FIG. 2, video storage database 202 is shown. Video storage database 202 stores entries that include videos and channels. Example entry 1 (212) is channel A, John Singer's Channel. Example entry 2 (214) is video A 214. Example entry 3 (216) is video B 216. More or less entries than depicted can be included in video storage database 202.

Each of descriptors, videos, channels, playlists, etc. has a category identifier associated therewith. Category identifiers provide one or more categories that are associated with the video. A category identifier can be created for a channel based on the videos within that channel. In the depicted embodiment of FIG. 2, channel A in entry 1 (212) does not have a category identifier associated therewith. Fuser 206 creates a category identifier for channel A. Additional information regarding a category identifier for a channel is provided herein below with respect to FIG. 4.

Extractor 204 extracts entries that include videos of a video channel (and their respective category identifiers) from video storage database 202. Video A in example entry 2 (214) has an associated category identifier. Video B in example entry 3 (216) has an associated category identifier. Each of these category identifiers includes one or more categories. Extractor 204 extracts the category identifier for each video and based on the category identifier, assigns a respective rating to each video. In another implementation, category identifiers may be stored external to video storage database 202 and accessible by extractor 204.

In an implementation, extractor 204 may analyze all entries associated with a channel. For example, John Singer's music video channel may include one or more videos in the entries. Extractor 204 may assign individual ratings to each video.

The assigned rating may be based on one or more factors. Extractor 204 analyzes the metadata for each video in an entry to determine its relevancy to the channel. Extractor 204 may use additional criteria for assigning a rating to an entry. The additional criteria may include how users utilize the entry. For example, suppose that a video in an entry included in a channel is rarely viewed by users. This particular video may have some associated keywords (e.g., stored as metadata) that do not appropriately characterize the channel. For example, if the channel relates broadly to automobiles, some keywords that may be associated with a majority of popular videos in the channel include automotive, engines, cars, speed, car racing, race car drivers, etc. However, a channel curator might have added the particular video to the channel even though it is not specifically related to automobiles but has some entertaining value. For example, this video may be a music video that is not related to automobiles and may be associated with keywords such as music, rap, hip-hop, dance music, etc. Therefore, the keywords associated with the particular video are not the same as the keywords that are associated with other videos of the channel. The particular video in the entry is then assigned a lower rating than the other videos of the channel.

In addition to using keywords and other information within metadata of a video, the content of the video itself can be utilized to determine a rating of a video in an entry. For example, the particular video entry can be for video A 302. Video A 302 is a video of an interview of John Singer. Text associated with video A 302 (e.g., closed caption text, other text contained in the video, etc.) may be analyzed by extractor 204 in order to assign a rating to video A 302. The text may indicate that a conversation takes place between people and no music or songs may be transcribed. In an embodiment, extractor 204 may assign a rating of 0.3 out of 1.0 to video A 302, where 0.0 indicates no relevance to the channel and 1.0 indicates high relevance to the channel. In an embodiment, a video in the channel that is very popular and is often viewed by users visiting the channel is relevant to the channel and is thus assigned a higher rating than a video that is not as popular.

Fuser 206 aggregates all of the ratings of all of the videos of a channel. Fuser 206 may discard some videos having ratings that are not within a particular range or out of a particular range. For example, fuser 206 may set a particular threshold for a rating as 0.3. Any video rated 3.0 or lower may be discarded by fuser 206. In an implementation, video A 302 may be discarded because its score of 0.3 is the same as the threshold score of 0.3. After discarding videos that are rated too low, fuser 206 then combines all of the rated videos to generate a score of the channel for each category in a category identifier for the channel.

In an embodiment, fuser 206 can be trained using artificial intelligence to categorize a channel based on information about the channel and the videos within the channel that are used as input signals to fuser 206. Details regarding fuser training are described herein below with respect to FIGS. 7-8.

Fuser 206 provides the scores of the channel for each category in the category identifier to video converter 208. Extractor 204 also provides information about the video in the entries to video converter 208. Video converter 208 converts the data identifying the channel provided by fuser 206 into a format that is suitable for use by various databases. For example, video converter 208 may convert the data identifying the channel into a format that is compatible with video search engines, word search engines, etc.

Video converter 208 then provides the data identifying the channel (which is in a proper format) to annotated channel database 210. The data identifying the channels is a final score that is assigned to a particular channel for each category specified by the category identifier. For example, a final score may be assigned to John Singer's music video channel as 0.8 on a scale of 0.0 to 1.0 in the category of music, where 0.0 is the lowest ranking and 1.0 is the highest ranking. Scores are also assigned to John Singer's channel in other categories specified by the category identifier.

The annotated channel database 210 then stores the scores associated with each channel. When an engine requires the information about the score of a channel, the score(s) is/are retrieved from the annotated channel database 210. A user may then perform a search for a channel and the search results are based on the scores of channels in various categories.

Figure 3:
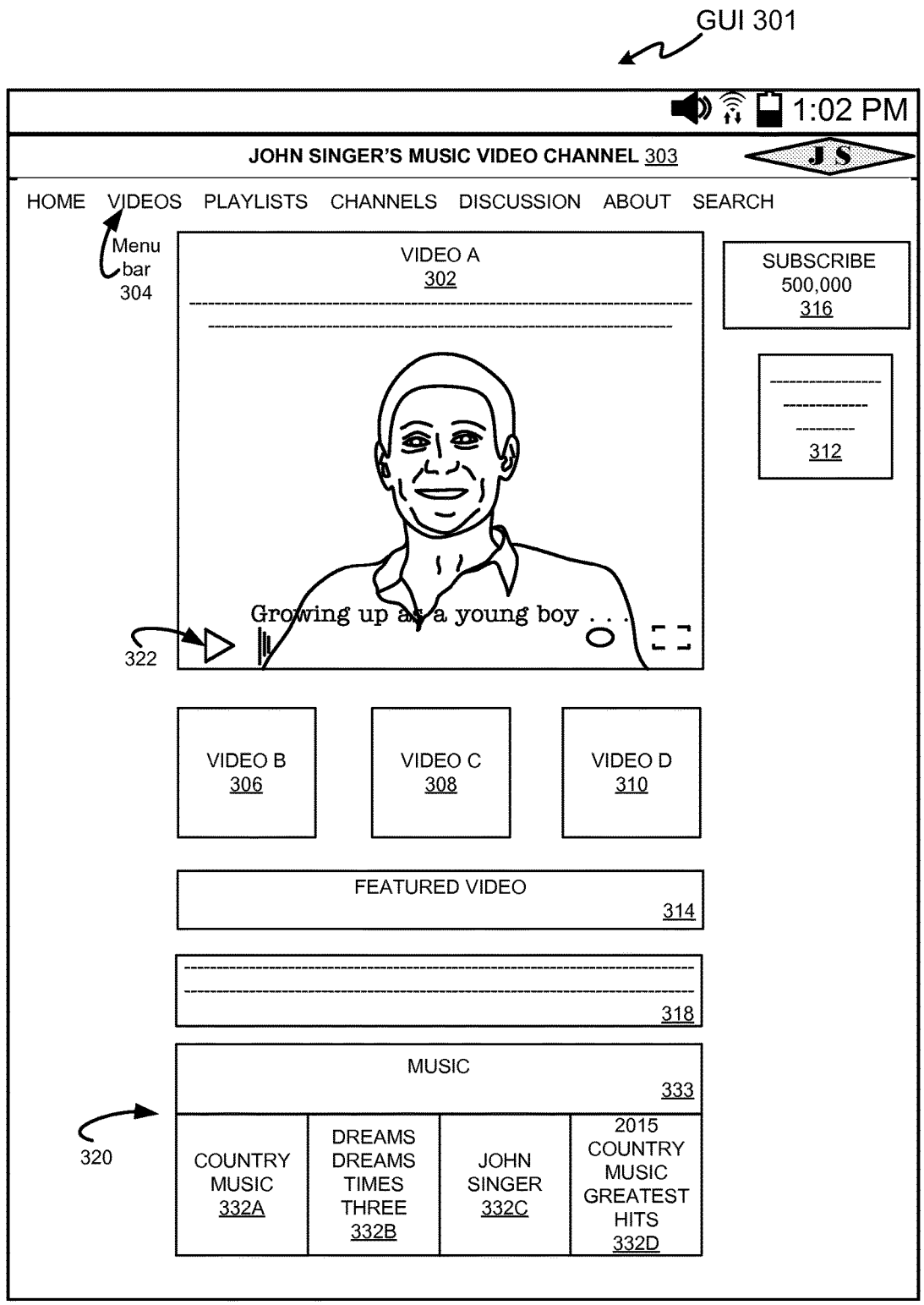
FIG. 3 is a diagram illustrating an exemplary graphical user interface window depicting a channel in accordance with an implementation of the disclosure.

FIG. 3 is a diagram illustrating an exemplary graphical user interface window depicting a channel in accordance with an implementation of the disclosure. Graphical user interface (GUI) 301 provides for display a graphical representation of John Singer's music video channel. John Singer's music video channel provided by GUI 301 in FIG. 3 is a graphical representation of channel 300 in FIG. 1. GUI 301 may include the title (John Singer's music video channel) 303. GUI 301 may be displayed to a user employing client device 110A using multimedia viewer 111A. A menu bar 304 provides various links including home, videos, playlists, channels, discussion, about, and search. Each of the menu bar 304 items may be clickable links, such as hyperlinks, that display a different webpage upon selection. Also included in GUI 301 is a subscribe link 316. The link may textually (and/or graphically) provide a number of all of the users subscribed to the channel. In the depicted embodiment, 500,000 subscribers subscribe to John Singer's music video channel.

GUI 301 also includes a main region and various other regions. In some implementations, each region can contain, depict, or otherwise present videos. The main region may provide a display of a featured video. In another implementation, the main region may display a selected video (video A 302, as shown in FIG. 3). Other regions may be included in the channel that provides access to other videos. A side region may provide an area for advertisement video 312. Other videos may be provided in any of the regions of the channel.

Access to other videos is provided to a user viewing John Singer's music video channel. The videos include video B 306, video C 308, video D 310, and featured video 314. Other videos 318 may also be included within John Singer's music video channel. Each of the additional videos (other than video A 302 displayed in the main region) is represented by a respective thumbnail. Each thumbnail may contain a miniaturized version of video streams of the respective videos, static images (e.g., a representative image, a logo, etc.) associated with the respective videos, a miniaturized version of the respective video, or combinations thereof. It should be noted that although the videos displayed by GUI 301 are depicted as being rectangular in shape, other shapes may instead be displayed (e.g., a circle, a trapezoid, etc.).

GUI 301 also includes a textual representation 320 of a category identifier for channel 300. In another embodiment, the representation of the category identifier may be provided in a graphical and/or a combination of a graphical and textual form. Textual representation 320 may provide a list of categories that can be relevant to the channel. A broad category 333 associated the channel is depicted as music. Narrow categories (332A-332D) associated with the channel include country music, Dreams Dreams Times Three, John Singer, and 2015 country music greatest hits. Details regarding how these categories are derived for the channel are described herein below.

In an embodiment, each of the categories may include hyperlinks. Upon selection of a hyperlink, the category may expand to provide a list of additional relevant channels. For example, upon selection of broad category 333, a pop-up window external to GUI 301 or window or frame internal to GUI 301 may provide a list of other channels that are relevant to the broad category of "music." The listed channels may be arranged in a hierarchical manner such that the top listed channels are more relevant to the category of music than the bottom listed channels. Details regarding the scoring of the channels that determines channel relevancy to a category are described below. The channels in the list may be represented as hyperlinks. When such a hyperlink is activated, a viewer is presented with a home screen of the relevant channel.

In an implementation, upon selection of a particular video (e.g., video B 306, video C 308, video D 310) depicted in GUI 301, the particular video is provided in the main region (where video A 302 is provided in the implementation of FIG. 3). The previous video that occupied the main region swaps spots with the area the selected video was in prior to the selection (or moves elsewhere). The selection may be made by using a device such as a mouse, a digital pen, etc., depression of a key, selection made by touching a touchscreen display, or other means of selection. Once a video is provided in the main region, the video can be played either automatically or upon depression of a play icon or symbol 322. Once the video is playing, the play icon 322 may toggle to a pause icon (not depicted). Once the video is paused by selection of the pause icon, the pause icon may then toggle back to the play icon 322. Other icons may be provided. In the depicted embodiment of FIG. 3, closed captioning or other captions may be provided for display within the video. For example, video A 302 is a video of an interview of John Singer and the caption provides a text of his speech: "Growing up as a young boy . . . ".

In the embodiment depicted in FIG. 3, a user employing client device 110A using multimedia viewer 111A to view channel 300 is using a mobile device. In another embodiment, the user may employ any other type of device to view John Singer's music video channel.

Figure 4:
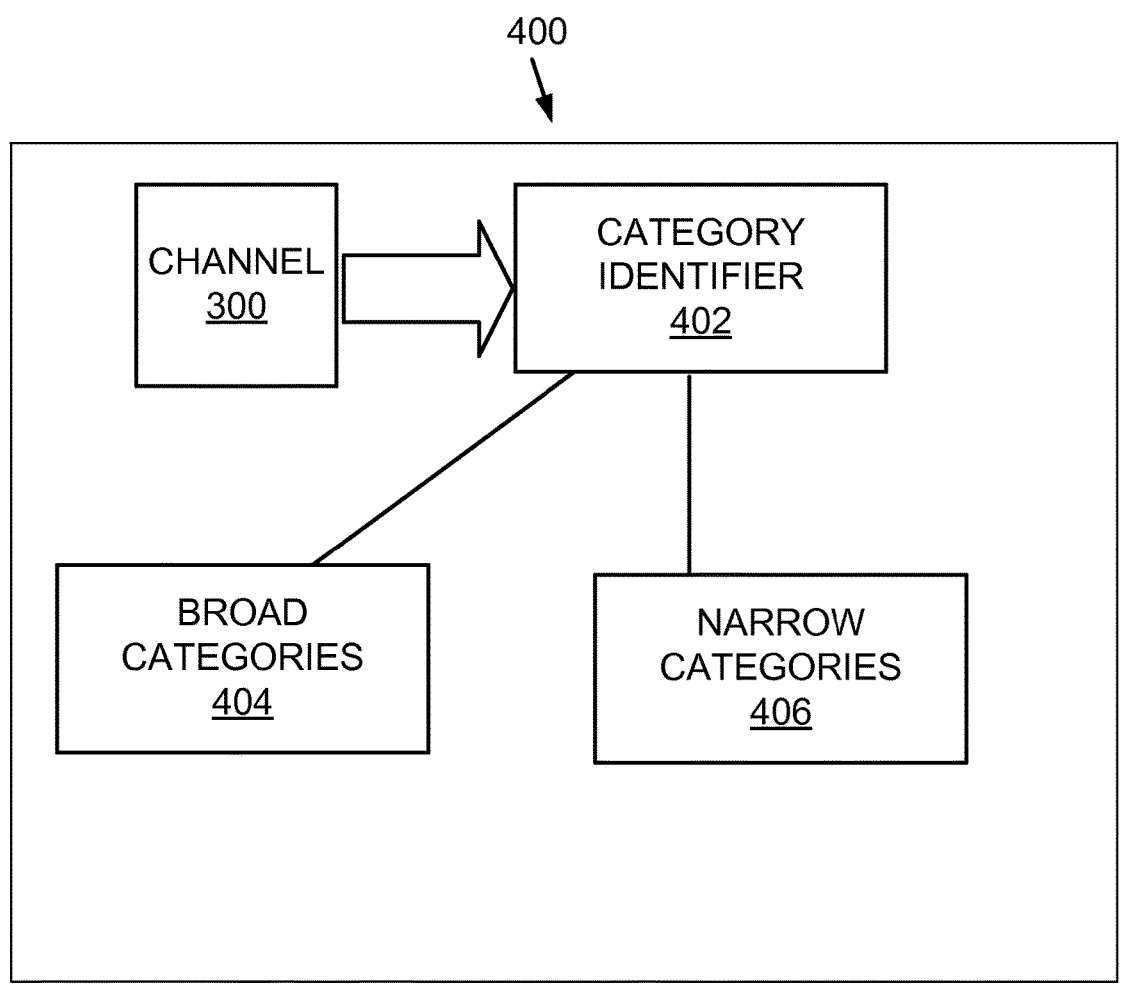
FIG. 4 is a diagram illustrating a category identification of a channel in accordance with an implementation of the disclosure.

Category identifiers may be assigned to channels (including groups of videos). FIG. 4 is a diagram illustrating a categorization of a channel in accordance with an implementation of the disclosure. In FIG. 4, a categorization 400 of a channel is shown. Multiple videos that comprise channel 300 have an associated category identifier 402. In an implementation, category identifier 402 is attached to a channel including multiple videos by fuser 206. The term "attached to" refers to associating/linking a category identifier with a video or channel. The category identifier may be in the form of metadata that is associated with a video or channel. The category identifier may include multiple categories that are associated with the video or channel to which the category identifier is attached. Category identifier 402 is created by fuser 206. Category identifier 402 may have associated therewith and specify broad categories 404 or narrow categories 406. Textual representations 320 of the broad and narrow categories are provided in FIG. 3. In an embodiment, broad categories 404 are general categories that can be associated with a channel. Broad categories 404 may include news, sports, geography, music, art, games, automotive, comedy, animation, documentaries, etc. Broad categories are also referred to as taxonomy classifiers used to classify a channel on a broad basis. Narrow categories 406 may be a subset of broad categories 404 and are narrower than the broad categories. Some examples of narrow categories include pop music, country music, rock music, classical music, tennis, South America, impressionistic art, adventure games, etc.

In the embodiment depicted in FIG. 4, for John Singer's music video channel, broad categories 404 include music. Narrow categories 406 include country music, music videos, John Singer's music, popular music, 2015 country music greatest hits, etc. Details regarding how the categories (broad and narrow) specified by the category identifiers are selected for a channel by fuser 206 are described herein.

Figure 5:
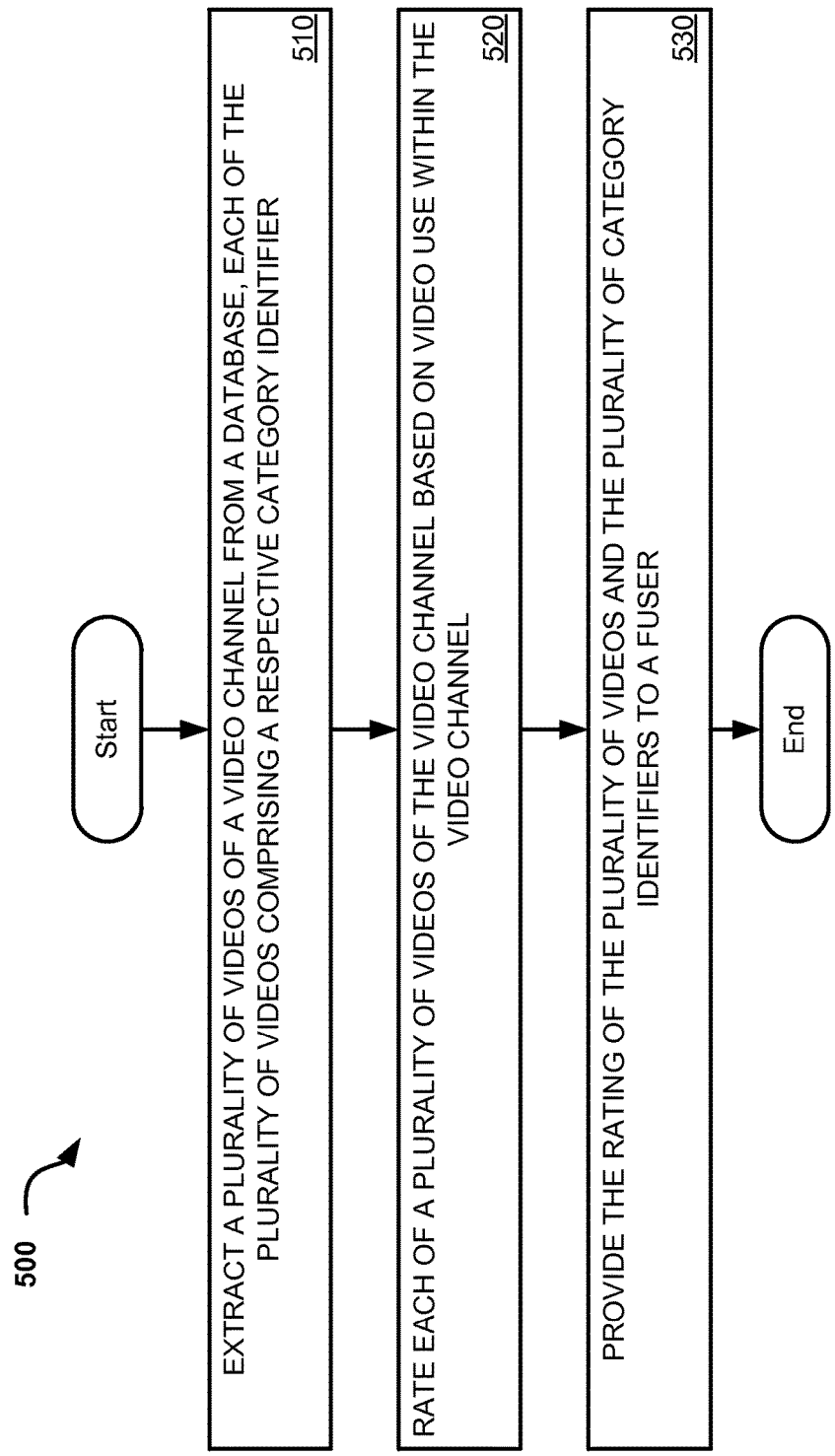
FIG. 5 is flow diagram illustrating a method for rating videos in a video channel according to an implementation of the disclosure.

FIG. 5 is flow diagram illustrating a method 500 for rating videos in a video channel according to an implementation of the disclosure. Method 500 may be performed by processing logic that includes hardware (e.g., circuitry, dedicated logic, programmable logic, microcode, etc.), software (e.g., instructions run on a processing device to perform hardware simulation), or a combination thereof. In one implementation, method 500 may be performed by extractor 204 as described with respect to FIG. 2. In describing the method 500, reference is made to FIG. 2 to illustrate an implementation. It is noted that the example provided in FIG. 2 is meant for illustrative purposes, and is not to be considered a limiting implementation. Further, method 500 illustrates rating videos in a video channel. However, method 500 can be used to rate other multimedia content that is included in a video channel.

Referring again to FIG. 5, method 500 begins at block 510 when a plurality of videos of a video channel is extracted from a database where each of the plurality of videos comprises a respective category identifier. In FIG. 2, extractor 204 extracts a plurality of videos, channel descriptors, channel titles, etc. stored as entries (i.e., example entry 1 (212), example entry 2 (214), and example entry 3 (216)) from video storage database 202. Each of the videos within the entries comprises a respective category identifier. The category identifiers may include narrow and broad categories associated with the videos. The category identifiers may be stored within video storage database 202 or elsewhere. The categories in the category identifiers may be categories that are selected by the creator of the channel, where the creator annotates the channel with certain categories, categories that are derived from keywords contained with the channel or within the description (such as an "About Us" section or the title of the channel), categories that are derived from extracted text of the channel, etc. Channel 300 may be associated with descriptors such as the text contained in the title of the channel that are used to categorize the channel. However, such categorization may not be accurate or may be incomplete because it is not based on a calculated scheme that utilizes several factors in order to property identify appropriate categories that should be associated with the channel. Thus, the descriptors associated with the channel may be inappropriately associated with the channel. For example, certain keywords may be added as metadata by the creator of the channel. However, the keywords may not properly indicate which categories the channel should actually be associated with. In an implementation, the channel within example entry 1 (212) (channel 300) may not be associated with categories. The categories that are to be associated with channel 300 are determined by fuser 206, as described below with respect to FIG. 6. Example entry 1 (212) may include some basic information about the channel such as a description of the channel, a title of the channel, etc. In an embodiment, video storage database 202 contains within example entry 1 (212) a name of the channel: "John Singer's Music Video Channel." In an embodiment, the videos and respective category identifiers are stored within the same database (i.e., video storage database 202). In another embodiment, the entries, the videos or respective category identifiers may be stored in more than one database.

Referring back to FIG. 5, at block 520, each of a plurality of videos of the video channel is rated based on video use within the video channel. Extractor 204 rates videos within entries 2 and 3 based on video use within channel 300. Extractor 204 analyzes data relating to video use that is stored in video storage database 202. In an implementation, the data may be stored elsewhere and accessible by extractor 204. The data for a particular channel may include a number of clicks/videos played, an average channel-driven watch-time of the video played, a number of subscribers to the video, the number of other videos that are clicked-through prior to and after the video is selected/played, a percentage of the users that visit the channel that access the video, curation versus uploading of videos, searching versus consuming the videos through feeds, and other information about how users view the video within the channel.

Suppose that for the video B 306 that is stored in example entry 2 (214), users that visit John Singer's music video channel frequently view video B 306. Data about use of video B 306 may indicate, for example, that a million users clicked on the video, users on average watch 3 minutes 20 seconds of the 4 minute video, 80% of all visitors to the channel view the video, the video is watched as the first video of the channel 50% of the time, and the video has 300,000 subscribers. This data may be based on a range of time (e.g., within a week, within a month, etc.) and may be averaged over the total users. Annotations (metadata) associated with video B 306 and text extracted from video B 306 may indicate that video B is a music video entitled "Dreams Dreams Times Three." A category identifier associated with video B may include a broad category of music and narrow categories including country music, Dreams Dreams Times Three, John Singer, and 2015 country music greatest hits. The particular video is a popular video within John Singer's music video channel and many people who are interested in channel 300 are also interested in video B 306. Therefore, the video is of relevance to the channel. Based on the analyzed data, extractor 204 rates video B 306 0.8 out of 1.0, where 0.0 is not used within/not popular within the video channel at all and 1.0 indicates that the video is always used within/is popular within the video channel.

As described above, video A 302 is a video of an interview of John Singer. Most users that visit John Singer's channel want to watch John Singer's music videos and are not as interested in news about Singer (e.g., Singer's interviews). Therefore, video A 302 may not be as popular of a video compared to other videos which are Singer's music videos. Extractor 204, based on use of video A, determines that video A is to be assigned a score of 0.3 out of 1.0. A category identifier that is associated with video A 302 may include a broad category of news and narrow categories including celebrity interviews, John Singer, and award winning journalist interviews.

A similar rating scheme may be used to assign scores to all videos associated with John Singer's music video channel. Although videos are described in the examples, any type of multimedia content may similarly be rated.

Referring back to FIG. 5, at block 530, the rating of the plurality of videos and the plurality of category identifiers are provided by extractor 204 to fuser 206. Extractor 204 provides all of the video ratings (including both high and low rated video ratings) and all of the category identifiers, including broad and narrow categories of all of the videos and the channel itself, to fuser 206 for further processing. Extractor 204 may also provide additional information including a description of the channel and associated metadata (i.e., channel descriptor) to fuser 206. A channel descriptor can include a title of a channel, a description of a channel, and/or a user-assigned category. A description of the channel can be input by a user that creates the channel or extracted from a web description of a channel (e.g., data that is included in the about us section of a website), etc. A user-assigned category can be selected by the user that creates the channel. For example, the user may select "music" as a category of the channel. Such information may be packaged together prior to transmission to fuser 206. Method 500 then ends.

Figure 6:
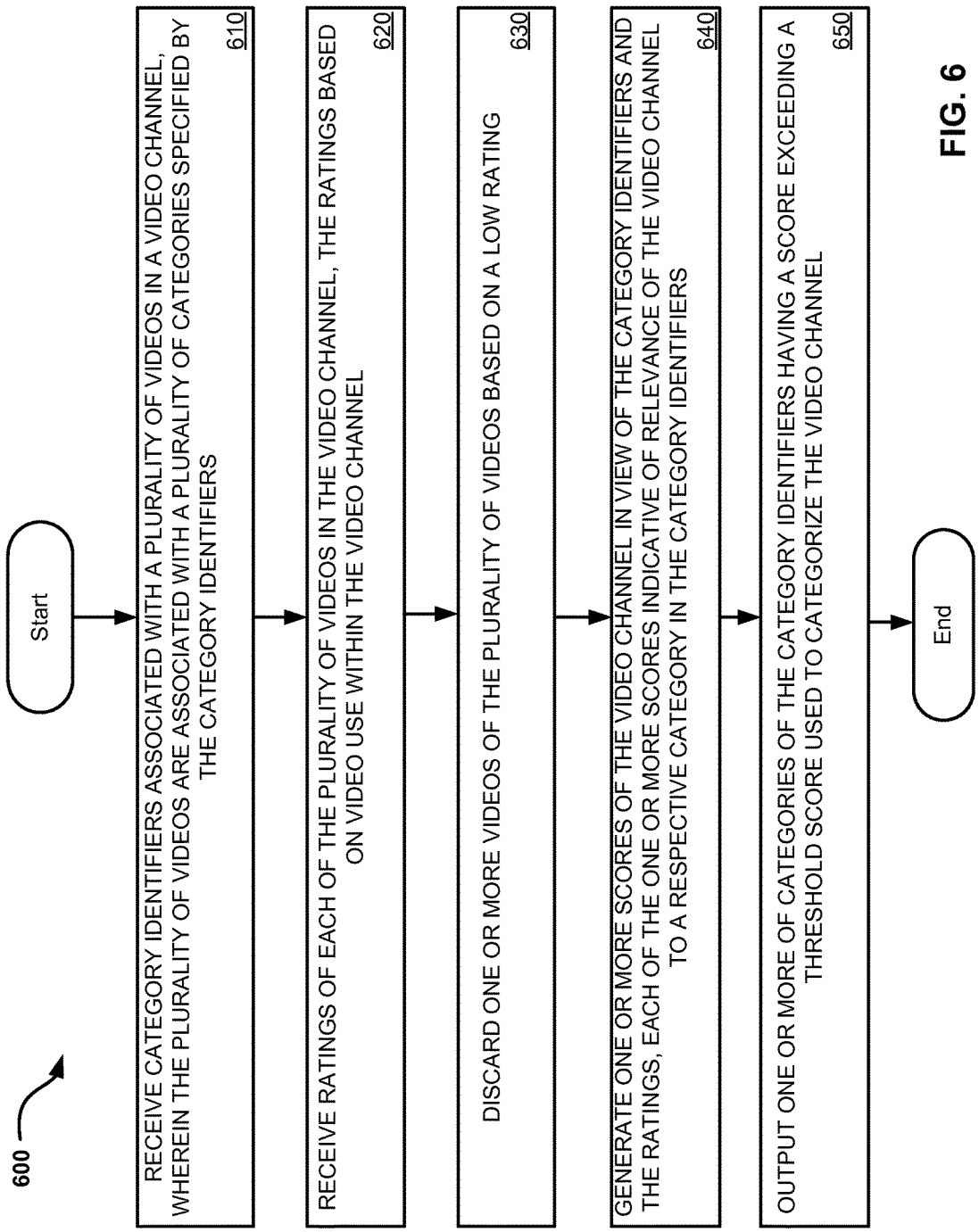
FIG. 6 is a flow diagram illustrating a method for categorizing a video channel according to an implementation of the disclosure.

FIG. 6 is a flow diagram illustrating a method 600 for categorizing a video channel according to an implementation of the disclosure. Method 600 may be performed by processing logic that includes hardware (e.g., circuitry, dedicated logic, programmable logic, microcode, etc.), software (e.g., instructions run on a processing device to perform hardware simulation), or a combination thereof. In one implementation, method 600 may be performed by fuser 206 as described with respect to FIG. 2. In describing the method 600, reference is made to FIG. 2 to illustrate an implementation. It is noted that the example provided in FIG. 2 is meant for illustrative purposes, and is not to be considered a limiting implementation. In an embodiment, the method 600 of FIG. 6 starts when the method 500 of FIG. 5 ends.

Referring again to FIG. 6, method 600 begins at block 610 when category identifiers associated with a plurality of videos in a video channel are received. In FIG. 2, fuser 206 receives category identifiers associated with a plurality of videos in channel 300 from extractor 204. The plurality of videos is associated with a plurality of categories specified by the category identifiers. Fuser 206 may receive the category identifiers that include broad and narrow categories associated with each individual video from extractor 204.

Referring again to FIG. 6, at block 620, ratings of each of the plurality of videos in the video channel are received, where the ratings are based on video use within the video channel. Fuser 206 receives ratings of each of the plurality of videos in channel 300 from extractor 204.

In an embodiment, the category identifiers and/or the ratings may be received together as a package by fuser 206.

At block 630, one or more videos of the plurality of videos are optionally discarded based on a low rating. Fuser 206 discards one or more videos that have a low rating. The settings for a low rating threshold can be set (and/or reset) by a user (such as a programmer, for example). A low rating may be defined by the user as 0.3 or lower within the scale of 0.0 to 1.0. For example, fuser 206 may discard video A 302 because 0.3 is the cutoff threshold for a low rating. By discarding video A 302, fuser 206 also discards the associated category identifier categories (including all associated broad and narrow categories) and the associated rating. For example, if one of the narrow categories associated with video A 302 is celebrity interview, then this category is discarded due to the low score of video A 302.

In an embodiment, elimination of a low rated video is performed in order to discount or disregard any video(s) which is not representative of the channel as a whole. For example, the contents of video A 302 is an interview, and such content is not representative of John Singer's music videos and therefore, does not have a bearing on and is not relevant to John Singer's music video channel.

In another embodiment, more than one low rated video may be discarded. In yet another embodiment, it may be determined that no videos are low rated (and that all videos contained within a channel are relevant to the channel). If no video scores fall below the cutoff, then no videos or categories specified by the category identifiers are discarded.

At block 640, one or more scores of the video channel are generated in view of the category identifiers and the ratings, where each of the one or more scores is indicative of relevance of the video channel to a respective category specified by the category identifiers. Fuser 206 generates scores of the video channel in view of the category identifiers and the ratings. Each score indicates a relevance of a video channel to a respective category specified by the category identifiers. Fuser 206 may analyze the broad categories specified by the received category identifiers and metadata to determine broad and narrow categories to associate with the channel. Suppose that fuser 206 determines a broad category associated with John Singer's music video channel to be music. Narrow categories may include John Singer, country music, music videos, John Singer's music, popular music, 2015 country music greatest hits, Dreams Dreams Times Three, etc. Each of these categories may be based upon individual videos, channel descriptors, or other annotation (metadata) associated with videos within John Singer's channel.

Fuser 206 may then generate a score of the video channel for each category specified by the category identifiers. Fuser 206 may further base the channel score on how users consume the multimedia content available on the channel. The channel consumption factors include a number of channel views, channel-driven watch time, channel subscribers, channel use, channel curation events, or other criteria. If one or more of these user consumption factors are significantly large (i.e., a large number of users watch the channel, "like" the channel, or subscribe to the channel, most users spend a great deal of time browsing the channel before exiting the channel, etc.), fuser 206 may assign a high score to channel based on these consumption factors. If, however, one or more of the consumption factors are small, then the channel may be assigned a lower score. In an embodiment, a score of a video channel may be used for purposes of ranking. The video channel with the highest score may be the number one video in a particular category followed by the video channel with the next higher score and so forth. Suppose that John Singer's music video channel is assigned a score of 0.8 on a scale of 0.0 to 1.0, where 0.0 is the lowest possible score and 1.0 is the highest possible score, in the broad category of music specified by the category identifier. Based on this score, John Singer's music video channel may be provided within the most popular music video channels in the music category. In an embodiment, suppose that John Singer has released only one new song in the year 2014. John Singer's music video channel may be assigned a score of 0.1 in the narrow category of 2014 country music greatest hits. Therefore, John Singer's music video channel may not appear among the top channels in the category of 2014 country music greatest hits.

Fuser 206 assigns respective scores to John Singer's music video channel in each category (broad and/or narrow). The categories are specified by the category identifiers of individual videos that are received by fuser 206 from extractor 204 (and are not contained within one of the videos that are discarded by fuser 206).

At block 650, one or more categories of the category identifier having a score exceeding a threshold score used to categorize the video channel are output. Fuser 206 outputs to video converter 208 in FIG. 2 all categories (broad and/or narrow) specified by the category identifiers that have a score that exceeds a threshold score which are used to categorize channel 300. The threshold score can be set (and/or reset) by a user (such as a programmer, for example) controlling channel categorization subsystem 120. The threshold score may be defined by the user to be less than or equal to a certain number within a scale (e.g., a scale of 0.0 to 1.0). In an embodiment, the threshold score may be determined automatically based on constraints such as the quality of categorization (how fine the categorization that is performed is), a total number of categories in which categorization is performed, or based on user input. Fuser 206 may determine to discard a category if it does not meet a threshold score. For example, fuser 206 may determine to discard the category of 2014 country music greatest hits because a score of 0.1 may not meet a threshold score. Fuser 206 may determine to output the following categories for John Singer's music video channel which are used to categorize the channel: music, country music, music videos, John Singer's music, popular music, and Dreams Dreams Times Three. Each of these categories exceeds the threshold score and is thus output by fuser 206. These categories are then combined to create category identifier 402 in FIG. 4 and are thus associated with channel 300. Method 600 then ends.

Video converter 208, after receiving data identifying a channel and its respective categories, converts the data identifying the videos within the channel into a format suitable for viewing by client devices 110A-110Z. The converted data identifying the videos within the channel and the categories of the category identifiers (contained within category identifier 402) are then stored in annotated channel database 210.

The converted data identifying the videos within the channel and associated category identifiers can then be provided to channel categorization subsystem 120 (or other servers). The server can use the converted data identifying the videos and associated category identifiers to rank the channels, improve text and/or video searches, etc.

The category identifiers can be used to separate channel words or phrases that have different meanings. Suppose that a user wishes to search for the music band named Chicago. If the user uses an ordinary text search and types Chicago as the keyword to be searched, the results may include a city in the United States, a movie, or the music band. However, by using category identifiers, the user can sort through categories and select Chicago in the category of musicians.

In another embodiment, the user that wishes to find music by the band named Chicago can view links of categories to find the correct Chicago. The user may be provided with a broad category entitled music. Upon clicking on the music link, narrow categories may be shown to the user so that the user can find the Chicago music video channel that he/she was looking for.

Figure 7:
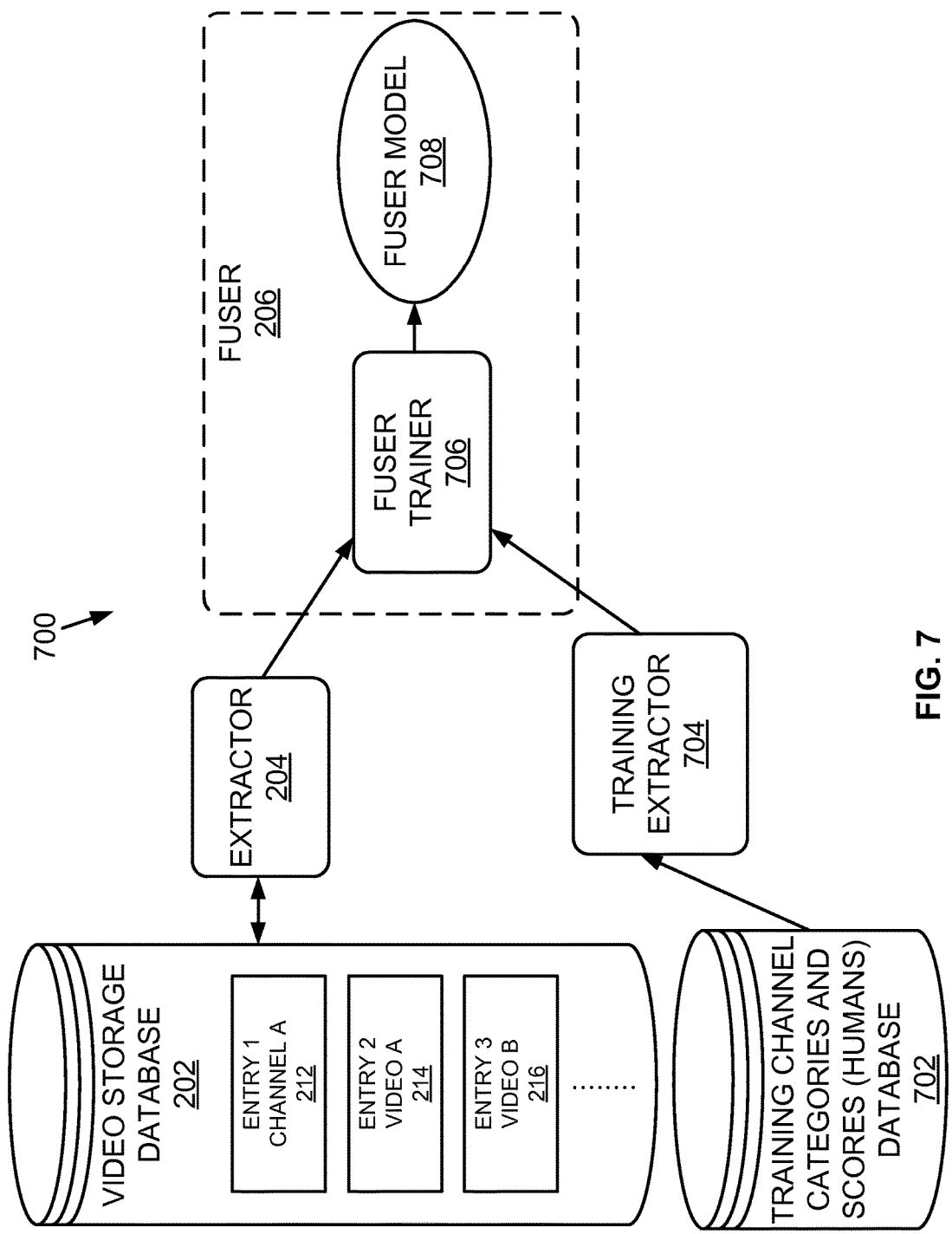
FIG. 7 is a block diagram illustrating functional components used in fuser training according to an implementation of the disclosure.

In an embodiment, in order for fuser 206 to improve its scoring scheme, an artificial intelligence training system may be implemented. FIG. 7 is a block diagram illustrating functional components 700 used in fuser training. In an embodiment, channel categorization subsystem 120 includes some of the components 700 (e.g., modules, submodules, applications, etc.) that can be executed by one or more processors of channel categorization subsystem 120. These components may include, for example, video storage database 202, extractor 204, fuser 206, training channel categories and scores (such as scores determined by humans) database 702, and a training extractor 704. In an embodiment, video storage database 202, extractor 204, and fuser 206 are the same components depicted by FIG. 2. Fuser 206 in FIG. 7 includes fuser trainer 706 and fuser model 708. More or less components 700 can be included to provide functionality described herein. In another embodiment, some or all of components 700 can be accessed by channel categorization subsystem 120 but may be located external to channel categorization subsystem 120.

In FIG. 7, extractor 204 extracts entries that include videos and a corresponding channel title, description, etc. which are provided to fuser trainer 706.

Training channel categories and scores database 702 includes channel categories and scores that are set by people. Humans view channels (and videos included in the channel) and manually assign categories and associated scores to the channel. These categories include broad and/or narrow categories. For example, humans may watch channel 300 and determine that John Singer's music video channel is associated with a broad category identifier (i.e., category) of music. Humans may assign an average score to John Singer's music video channel as 0.8 on a scale of 0.0 to 1.0 in the category of music, where 0.0 is the lowest ranking and 1.0 is the highest ranking. Additional scores may be assigned to additional categories of the channel. Fuser trainer 706 of fuser 206 obtains each of the categories and associated scores from the training channel categories and scores database 702 and uses them to train fuser model 708.

Fuser trainer 706 builds a machine-learned model (i.e., fuser model 708) to score and categorize any future channels based on how humans categorized and scored similar previous channels and based on the videos contained within the channel. Fuser model 708 may be trained by fuser trainer 706 which generates a function that predicts the channel categories and associated scores for any future channels that are stored in video storage database 202. In an implementation, fuser trainer 706 obtains training channel categories and scores from training channel categories and scores database 702 every time new channel categories/scores are available. In this way, fuser trainer 706 may constantly or periodically be learning and adapting to the way humans perform channel categorization and scoring. Fuser trainer 706 may obtain many different channel categories and scores from training channel categories and scores database 702 and determine a pattern between the various channels that are rated by humans. Once fuser model 708 has "learned" how to categorize and score channels, it can apply the function (i.e., based on the pattern) to any future channel. Specifically, the function is then applied to a channel stored in video storage database 202 and extracted by extractor 204 and provided to fuser trainer 706 to provide machine calculated categories and associated scores for the channel. Thus, fuser trainer 706 learns how to train (or build) fuser model 708 to mimic the mental process of assigning channel categories and scores to channels in a manner similar to how humans categorize and score a channel. In other words, fuser model 708 is trained to mimic the way the humans perform the categorization and scoring of the categories for a channel. Fuser model 708 can then predict channel scores and categories so that additional channels can be scored without the assistance of humans. The end result of the training by fuser trainer 706 is to create a function that can predict channel categories and associated scores.

In an implementation, suppose that human(s) categorize and score channel 300. The human scores for each category is stored in training channel categories and scores database 702 and are provided to fuser trainer 706. The human(s) may categorize channel 300 within the broad category of music and the narrow categories of country music, and John Singer. The category identifier of music may be scored by the human(s) as 0.8, country music may be scored by the human(s) as 0.5, and John Singer may be scored by the humans as 1.0. Fuser trainer 706 also obtains information about channel 300 and the videos within the channel as input signals from video storage database 202. The information may include basic information about the channel such as a description of the channel, a title of the channel, etc. In an implementation, this information is a name of the channel such as "John Singer's music video channel." The videos within the channel include video A and video B. These videos each have associated category identifiers that are attached to respective videos. The category identifiers may be stored within video storage database 202 or elsewhere. Suppose that each of video A and video B have the following category identifiers: music, country music, and John Singer. Fuser trainer 706 obtains the information about the channel and the videos within the channel to use as input signals to fuser 206. When fuser trainer 706 trains fuser model 708, it observes that any channel such as channel 300 that has two videos (i.e., video A and video B) with some particular category identifiers, that humans assign the channel a score of 0.8 in the category of music, 0.5 in the category of country music, and 1.0 in the category of John Singer. Thus, future channels having similarities to channel 300 would be categorized and scored similar to channel 300. Fuser model 708 may assign the human categorization and scores to channel 300 and perform a similar categorization and scoring schema for future channels. Thus, fuser model 708 outputs a category identifier for channel 300 that includes the categories of music (having a score of 0.8), country music (having a score of 0.5), and John Singer (having a score of 1.0).

Figure 8:
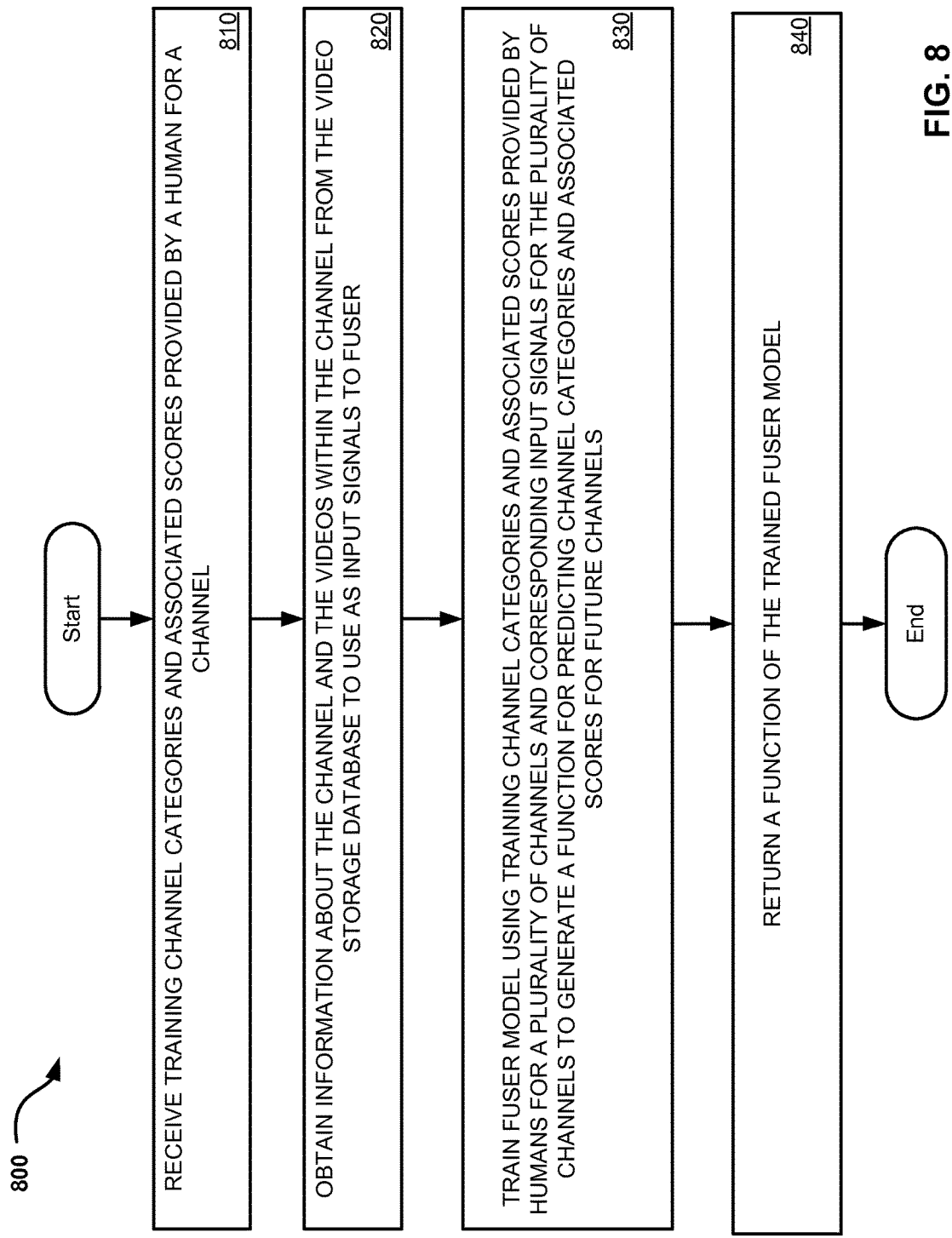
FIG. 8 is a flow diagram illustrating a method for training a fuser model to predict categories and respective scores for a channel according to an implementation of the disclosure.

Details regarding the process of fuser training is described with respect to FIG. 8.

FIG. 8 is a flow diagram illustrating a method 800 for training a fuser model to predict categories and respective scores for a channel according to an implementation of the disclosure. Training of the fuser model is also referred to as supervised learning or machine learning. Method 800 may be performed by processing logic that includes hardware (e.g., circuitry, dedicated logic, programmable logic, microcode, etc.), software (e.g., instructions run on a processing device to perform hardware simulation), or a combination thereof. In one implementation, method 800 may be performed by fuser 206 (and specifically by fuser trainer 706 and/or fuser model 708) as described with respect to FIG. 7. In describing the method 800, reference is made to FIG. 7 to illustrate an implementation. It is noted that the example provided in FIG. 7 is meant for illustrative purposes, and is not to be considered a limiting implementation.

Referring again to FIG. 8, method 800 begins at block 810 when training channel categories and associated scores provided by a human for a channel are received. In FIG. 7, fuser trainer 706 receives training channel categories and associated scores provided by a human (stored in training channel categories and scores database 702) for a channel. Recall that training extractor 704 extracts training channel categories and scores that are provided by human(s) for channels from training channel categories and scores database 702.

At block 820, information about the channel and the videos within the channel are obtained from the video storage database to use as input signals to the fuser. As described above with respect to FIG. 2, video storage database 202 stores information about the channel and the videos within the channel. The information about the channel and the videos within the channel are obtained by fuser trainer 706 from video storage database 202 to use as input signals to fuser 206.

At block 830, the fuser model is trained using training channel categories and associated scores provided by humans for a plurality of channels and corresponding input signals for the plurality of channels to generate a function for predicting channel categories and associated scores for future channels. Referring to FIG. 7, fuser trainer 706 trains fuser model 708 using training channel categories and associated scores that are provided by humans for a plurality of channels and corresponding input signals for the plurality of channels (stored in training channel categories and scores database 702) to generate a function for predicting channel categories and associated scores for future channels.

At block 840, a function of the trained fuser model is returned. Fuser model 708 returns the function for predicting channel categories and associated scores for future channels. The method then ends.

Fuser model 708 can then obtain any channel from video storage database 202 and then output categories and associated scores that channel. The categories and associated scores for a channel can then be attached within a category identifier of that channel. Any categories that do not have a score that meets a threshold score may be discarded by fuser model 708. Fuser model 708 can then provide the categories and associated scores of the video channel to video converter 208. Details regarding video converter 208 are described above.

In an implementation, as described above, block 640 in FIG. 6 generates one or more scores of the video channel. The generating of the one or more scores is based on a function of a trained fuser model (returned in block 840 of FIG. 8) that is generated to predict the scores.

The present disclosure often references video channels for simplicity and brevity. However, the teaching of the present disclosure can be applied to various types of grouped multimedia content including playlists, grouplets, groups or subsets of videos, etc.

The present disclosure references video channels and playlists including videos. However, the scoring schema of fuser 206 is not limited to videos. Fuser 206 is independent of the type of channel it is rating. Therefore, fuser 206 can score and generate category identifiers for non-video channels. In FIG. 2, video storage database, extractor 204, video converter 208, and annotated channel database 210 may be video-specific and fuser 206 may be independent of videos. Similarly, in FIG. 7, video storage database, extractor 204, training channel categories and scores database 702, and training extractor 704 may be video-specific and fuser 206 (including fuser trainer 706 and fuser model 708) may be independent of videos. Therefore, fuser 206 (and fuser trainer 706 and fuser model 708) may be adapted to function in video-specific and non-video specific environments.

In an embodiment, fuser 206 may be used to score a subset of channels (and not all channels). For example, fuser 206 may score only the top 50% of channels having the most click-throughs.

In an embodiment, channel 330 in FIG. 1 is entitled "Rock 'N RC Cars." Channel 330 may include rock music videos and radio control car videos. A central categorization of the channel based on channel metadata, the about us descriptor, etc., may indicate that the channel is about rock music videos and radio control car videos. Thus, the central categories include rock music videos and radio control car videos. However, the relevance of the channel to one or more categorizes yields a different result. Video A 352 is a radio control car video tutorial and video B 362 is a famous rock music video. Users that view/consume the videos on channel 330 are primarily interested in the videos related to radio control videos (such as video A 352) and not the rock music videos. Therefore, based on use of the videos by consumers, channel 330 is associated with categories including automotive, hobby kits, radio control, and how-to-videos in the category identifier. These categories are also referred to as relevant categories. The rock music videos in the channel are discarded when fuser 206 scores and categorizes the channel. The rock music videos are referred to as off-topic because they do not describe an aspect of the channel and are off-the topic of the relevant categories. Therefore, an emphasis is placed on how content is consumed within the channel by users for the sake of categorization instead of analyzing actual raw, unstructured content of the channel.

In an embodiment, if a relevance of the topic for a video channel cannot be determined (e.g., the channel is in a foreign language, links are not functioning, there is not enough information about the channel or topic available), then the channel (or some videos within the channel) can be categorizes as "don't know."

In an embodiment, a channel can be initially be categorized based on it's title, descriptor, etc. as a specialized channel, a broad channel, or a random channel. A specialized channel is related to a single topic and all (or a majority) of the videos contained in the channel are related to the single topic. Channel 300 is an example of a specialized channel. A broad channel is related to a single broad topic but the videos are not always about the same thing. Channel 330 is an example of a broad channel. A random channel may include various videos with no emerging topic in common.

Information about the owner of the channel may be evaluated prior to assigning scores and categorizes to the channel. The information includes whether the channel's owner is an official channel owner that has rights to the channel, if the owner has a particular brand, or if the owner is an unknown user not linked to anything in particular.

For simplicity of explanation, the various implementations of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the implementations of the methods disclosed in this specification are capable of being stored on an article of manufacture to facilitate transporting and transferring such methods to computing devices. The term "article of manufacture", as used herein, is intended to encompass a computer program accessible from any computer-readable device or storage media.

Figure 9:
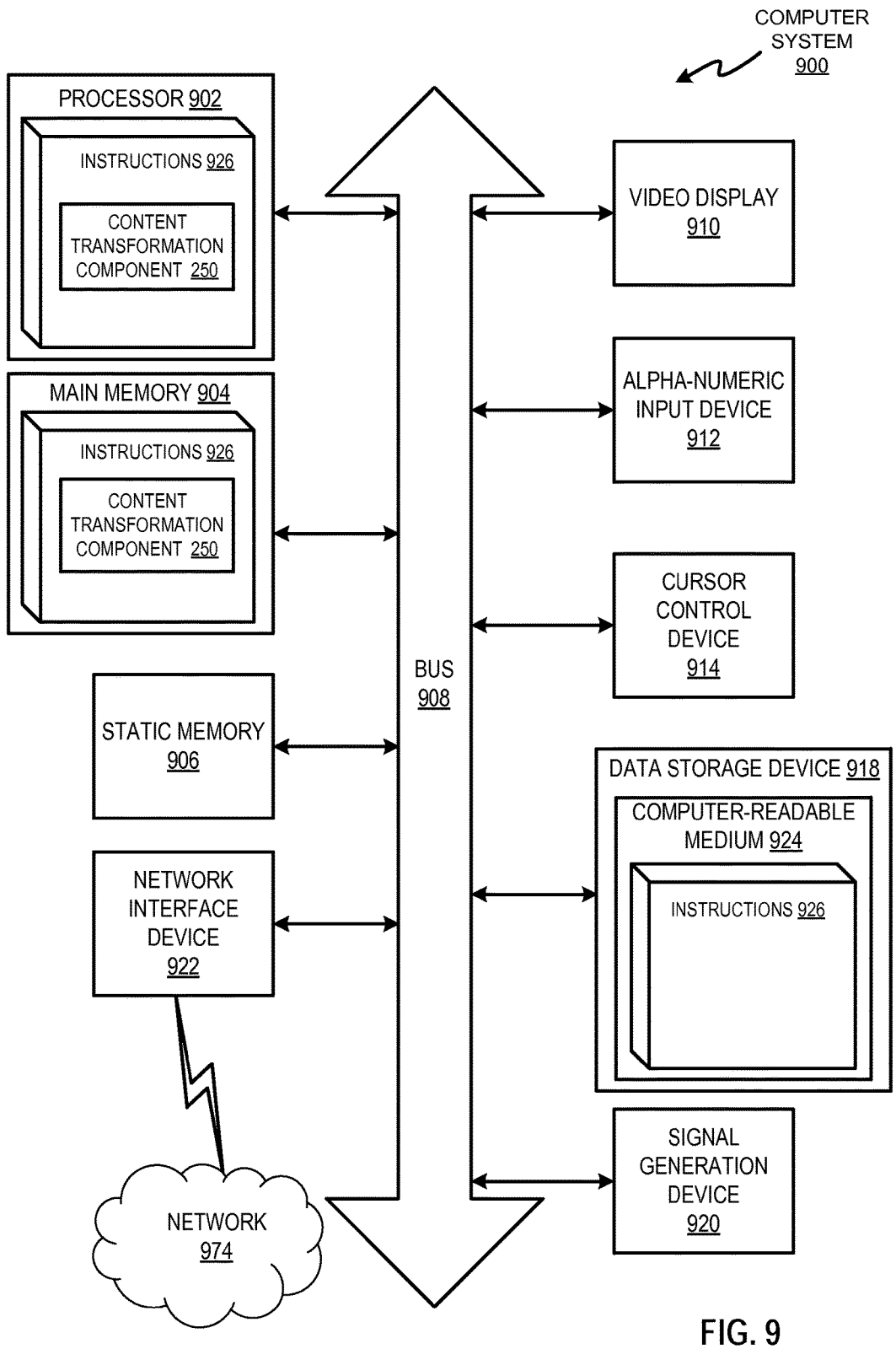
FIG. 9 is a block diagram illustrating an exemplary computer system in accordance with an implementation of the disclosure.

FIG. 9 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, or the Internet.

The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 900 may be utilized by or illustrative of one or more of client devices 110A-110Z, server 130, or channel categorization subsystem 120.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a DSP, network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD), a cathode ray tube (CRT), or a touch screen), an alphanumeric input device 912 (e.g., a keyboard), a cursor control device 914 (e.g., a mouse), and a signal generation device 920 (e.g., a speaker).

The data storage device 918 may include a computer-readable storage medium 924 on which is stored one or more sets of instructions 926 (e.g., software) embodying any one or more of the methodologies or functions described herein. The instructions 926 may also reside, completely or at least partially, within the main memory 904 and/or within the processor 902 during execution thereof by the computer system 900, the main memory 904 and the processor 902 also constituting computer-readable storage media. The instructions 926 may further be transmitted or received over a network 974 (e.g., network 105) via network interface device 922.

The computer-readable storage medium 924 may also be used to store instructions to perform a method for rating videos in a video channel, a method for categorizing a video channel, and a method of fuser training according to implementations of the disclosure, as described herein. While the computer-readable storage medium 924 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "transmitting", "generating", "adding", "subtracting", "inserting", "removing", "analyzing", "determining", "enabling", "identifying", "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

identifying, by a processing device of a server device that hosts a plurality of video channels, a video channel of the plurality of video channels provided by a multimedia content provider associated with the server device via a network to a plurality of user devices, wherein the video channel comprises a plurality of videos that are associated with a plurality of categories;

receiving, by the processing device, category identifiers associated with the plurality of videos in the video channel, wherein the plurality of categories are specified by the category identifiers;

receiving, by the processing device, ratings for the plurality of videos in the video channel, wherein each of the ratings corresponds to a respective video of the plurality of videos and is based on video use, wherein the video use indicates an average watch time of the respective video within the video channel from a first point in time each user accesses the video channel until a second point in time a respective user exits the video channel;

generating, by the processing device, category scores for the video channel in view of the category identifiers associated with the plurality of videos of the video channel, a channel-driven watch time associated with the video channel, and the ratings, wherein each of the category scores is indicative of relevance of the video channel to a respective category specified by a category identifier associated with one or more of the plurality of videos of the video channel, wherein the category scores of the video channel comprise a first category score for a first category specified by a first category identifier of the category identifiers and a second category score for a second category specified by a second category identifier of the category identifiers, wherein the first category identifier is associated with a first subset of videos of the plurality of videos of the video channel, and the second category identifier is associated with a second subset of videos of the plurality of videos of the video channel, wherein the first category score exceeds the second category score due to at least the first subset of videos being more popular than the second subset of videos during the channel-driven watch time, and wherein the channel-driven watch time is from the first point in time each user accesses the video channel until the second point in time the respective user exits the video channel;

in response to a first keyword search corresponding to the first category, providing, by the processing device via the network to a user device, first search results for the first keyword search, the first search results comprising a first list of a first subset of the plurality of video channels comprising the video channel, the video channel being ranked in the first list based on the first category score that corresponds to the first category; and in response to a second keyword search corresponding to the second category, providing, by the processing device via the network to the user device, second search results for the second keyword search, the second search results comprising a second list of a second subset of the plurality of video channels comprising the video channel, the video channel being ranked in the second list based on the second category score that corresponds to the second category, wherein the video channel is ranked higher in the first list than in the second list.

2. The method of claim 1, further comprising:

in response to determining that the first category score exceeds a threshold category score, categorizing the video channel by the first category.

3. The method of claim 1, wherein categories specified by the category identifiers comprise one or more of broad categories and narrow categories.

4. The method of claim 1, wherein the ratings are further based on one or more of a first number of subscribers to each of the plurality of videos, a second number of users uploading each of the plurality of videos, or a third number of users selecting to like each of the plurality of videos.

5. The method of claim 1, wherein:

the ratings are further based on at least one of associated keywords, associated text, or video content; and the method further comprises:

discarding one or more videos of the plurality of videos that are below a low rating threshold to generate an updated plurality of videos; and generating one or more updated category scores of the video channel in view of the category identifiers, the channel-driven watch time associated with the video channel, and a second set of ratings of the updated plurality of videos in the video channel.

6. The method of claim 1, wherein the category scores of the video channel are further generated based on user consumption of the video channel.

7. The method of claim 6, wherein the user consumption of the video channel comprises one or more of a number of channel views, channels subscribers, channel use, and channel curation events.

8. A system that hosts a plurality of video channels, the system comprising:
a memory; and
a processing device communicatively coupled to the memory, wherein the processing device is to:
identify a video channel of the plurality of video channels provided by a multimedia content provider associated with the system via a network to a plurality of user devices, wherein the video channel comprises a plurality of videos that are associated with a plurality of categories;
receive category identifiers associated with the plurality of videos in the video channel, wherein the plurality of categories are specified by the category identifiers;
receive ratings for the plurality of videos in the video channel, wherein each of the ratings corresponds to a respective video of the plurality of videos and is based on video use, wherein the video use indicates an average watch time of the respective video within the video channel from a first point in time each user accesses the video channel until a second point in time a respective user exits the video channel;
generate, by the processing device, category scores for the video channel in view of the category identifiers associated with the plurality of videos of the video channel, a channel-driven watch time associated with the video channel, and the ratings,
wherein each of the category scores is indicative of relevance of the video channel to a respective category specified by a category identifier associated with one or more of the plurality of videos of the video channel,
wherein the category scores of the video channel comprise a first category score for a first category specified by a first category identifier of the category identifiers and a second category score for a second category specified by a second category identifier of the category identifiers,
wherein the first category identifier is associated with a first subset of videos of the plurality of videos of the video channel, and the second category identifier is associated with a second subset of videos of the plurality of videos of the video channel,
wherein the first category score exceeds the second category score due to at least the first subset of videos being more popular than the second subset of videos during the channel-driven watch time, and
wherein the channel-driven watch time is from the first point in time each user accesses the video channel until the second point in time the respective user exits the video channel;
in response to a first keyword search corresponding to the first category, provide, via the network to a user device, first search results for the first keyword search, the first search results comprising a first list of a first subset of the plurality of video channels comprising the video channel, the video channel being ranked in the first list based on the first category score that corresponds to the first category; and
in response to a second keyword search corresponding to the second category, provide, by the processing device via the network to the user device, second search results for the second keyword search, the second search results comprising a second list of a second subset of the plurality of video channels comprising the video channel, the video channel being ranked in the second list based on the second category score that corresponds to the second category, wherein the video channel is ranked higher in the first list than in the second list.

9. The system of claim 8, wherein the processing device is further to:
in response to determining that the first category score exceeds a threshold category score, categorize the video channel by the first category.

10. The system of claim 8, wherein categories specified by the category identifiers comprise one or more of broad categories and narrow categories.

11. The system of claim 8, wherein the ratings are further based on one or more of a first number of subscribers to each of the plurality of videos, a second number of users uploading each of the plurality of videos, or a third number of users selecting to like each of the plurality of videos.

12. The system of claim 8, wherein:
the ratings are further based on at least one of associated keywords, associated text, or video content; and
the processing device is further to:
discard one or more videos of the plurality of videos that are below a low rating threshold to generate an updated plurality of videos; and
generate one or more updated category scores of the video channel in view of the category identifiers, the channel-driven watch time associated with the video channel, and a second set of ratings of the updated plurality of videos in the video channel.

13. The system of claim 8, wherein the category scores of the video channel are further generated based on user consumption of the video channel.

14. The system of claim 13, wherein the user consumption of the video channel comprises one or more of a number of channel views, channels subscribers, channel use, and channel curation events.

15. A non-transitory computer-readable storage medium storing instructions which, when executed, cause a processing device of a server device that hosts a plurality of video channels to perform operations comprising:
identifying a video channel of the plurality of video channels provided by a multimedia content provider associated with the server device via a network to a plurality of user devices, wherein the video channel comprises a plurality of videos that are associated with a plurality of categories;
receiving category identifiers associated with the plurality of videos in the video channel, wherein the plurality of categories are specified by the category identifiers;
receiving ratings for the plurality of videos in the video channel, wherein each of the ratings corresponds to a respective video of the plurality of videos and is based on video use, wherein the video use indicates an average watch time of the respective video within the video channel from a first point in time each user accesses the video channel until a second point in time a respective user exits the video channel;
generating, by the processing device, category scores for the video channel in view of the category identifiers associated with the plurality of videos of the video channel, a channel-driven watch time associated with the video channel, and the ratings,
wherein each of the category scores is indicative of relevance of the video channel to a respective category specified by a category identifier associated with one or more of the plurality of videos of the video channel, wherein the category scores of the video channel comprise a first category score for a first category specified by a first category identifier of the category identifiers and a second category score for a second category specified by a second category identifier of the category identifiers, wherein the first category identifier is associated with a first subset of videos of the plurality of videos of the video channel, and the second category identifier is associated with a second subset of videos of the plurality of videos of the video channel, wherein the first category score exceeds the second category score due to at least the first subset of videos being more popular than the second subset of videos during the channel-driven watch time, and wherein the channel-driven watch time is from the first point in time each user accesses the video channel until the second point in time the respective user exits the video channel;

in response to a first keyword search, providing, by the processing device via the network to a user device, first search results for the first keyword search, the first search results comprising a first list of a first subset of the plurality of video channels comprising the video channel, the video channel being ranked in the first list based on the first category score that corresponds to the first category; and in response to a second keyword search corresponding to the second category, providing, by the processing device via the network to the user device, second search results for the second keyword search, the second search results comprising a second list of a second subset of the plurality of video channels comprising the video channel, the video channel being ranked in the second list based on the second category score that corresponds to the second category, wherein the video channel is ranked higher in the first list than in the second list.

16. The non-transitory computer-readable storage medium of claim 15, wherein the operations further comprise:

in response to determining that the first category score exceeds a threshold category score, categorizing the video channel by the first category.

17. The non-transitory computer-readable storage medium of claim 15, wherein categories specified by the category identifiers comprise one or more of broad categories and narrow categories.

18. The non-transitory computer-readable storage medium of claim 15, wherein the ratings are further based on one or more of a first number of subscribers to each of the plurality of videos, a second number of users uploading each of the plurality of videos, or a third number of users selecting to like each of the plurality of videos.

19. The non-transitory computer-readable storage medium of claim 15, wherein:

the ratings are further based on at least one of associated keywords, associated text, or video content; and the operations further comprise:

discarding one or more videos of the plurality of videos that are below a low rating threshold to generate an updated plurality of videos; and generating one or more updated category scores of the video channel in view of the category identifiers, the channel-driven watch time associated with the video channel, and a second set of ratings of the updated plurality of videos in the video channel.

20. The non-transitory computer-readable storage medium of claim 15, wherein the category scores of the video channel are further generated based on user consumption of the video channel.

* * * * *